United States Patent [19]
Pryor

[11] Patent Number: 4,602,163
[45] Date of Patent: * Jul. 22, 1986

[54] ELECTRO-OPTICAL SYSTEMS FOR CONTROL OF ROBOTS, MANIPULATOR ARMS AND CO-ORDINATE MEASURING MACHINES

[76] Inventor: Timothy R. Pryor, 105 Centennial Dr., Tecumseh, Ont., Canada

[*] Notice: The portion of the term of this patent subsequent to Jun. 5, 2001 has been disclaimed.

[21] Appl. No.: 592,443

[22] Filed: Mar. 22, 1984

Related U.S. Application Data

[63] Continuation of Ser. No. 262,492, May 11, 1981, Pat. No. 4,453,085.

[51] Int. Cl.⁴ ............................................. G01N 2/86
[52] U.S. Cl. ...................................... 250/561; 901/47
[58] Field of Search ................. 901/47; 356/372, 376; 250/201, 202, 203 R, 548, 557, 561; 364/560–563

[56] References Cited

U.S. PATENT DOCUMENTS

| | | | |
|---|---|---|---|
| 3,852,579 | 12/1974 | Sohn et al. | 364/561 |
| 3,888,362 | 6/1975 | Fletcher et al. | 901/47 |
| 4,226,536 | 10/1980 | Dreyfus et al. | 356/376 |
| 4,337,566 | 7/1982 | DiMatteo et al. | 901/47 |
| 4,357,833 | 11/1982 | Wiklund et al. | 364/561 |

*Primary Examiner*—David C. Nelms
*Attorney, Agent, or Firm*—Larson and Taylor

[57] ABSTRACT

Method and apparatus are provided for correcting positional data produced by a machine including a member moveable in at least two co-ordinate axes. The machine includes an encoder for providing rough position data indicating the coarse position of the member in each of the axes and provision is made for moving the moveable member to a position data correction location wherein the actual position of the member is determined electro-optically in the two coordinate axes relative to a reference point external to the machine. A signal representative of the actual position is generated and used to correct the rough position data provided by the encoder.

6 Claims, 14 Drawing Figures

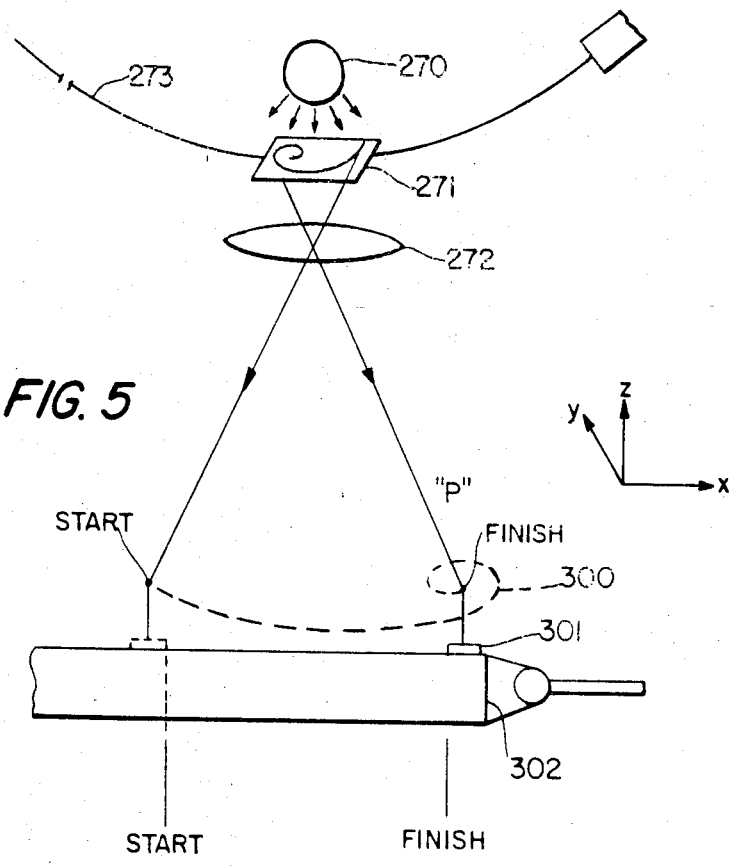
FIG. 5
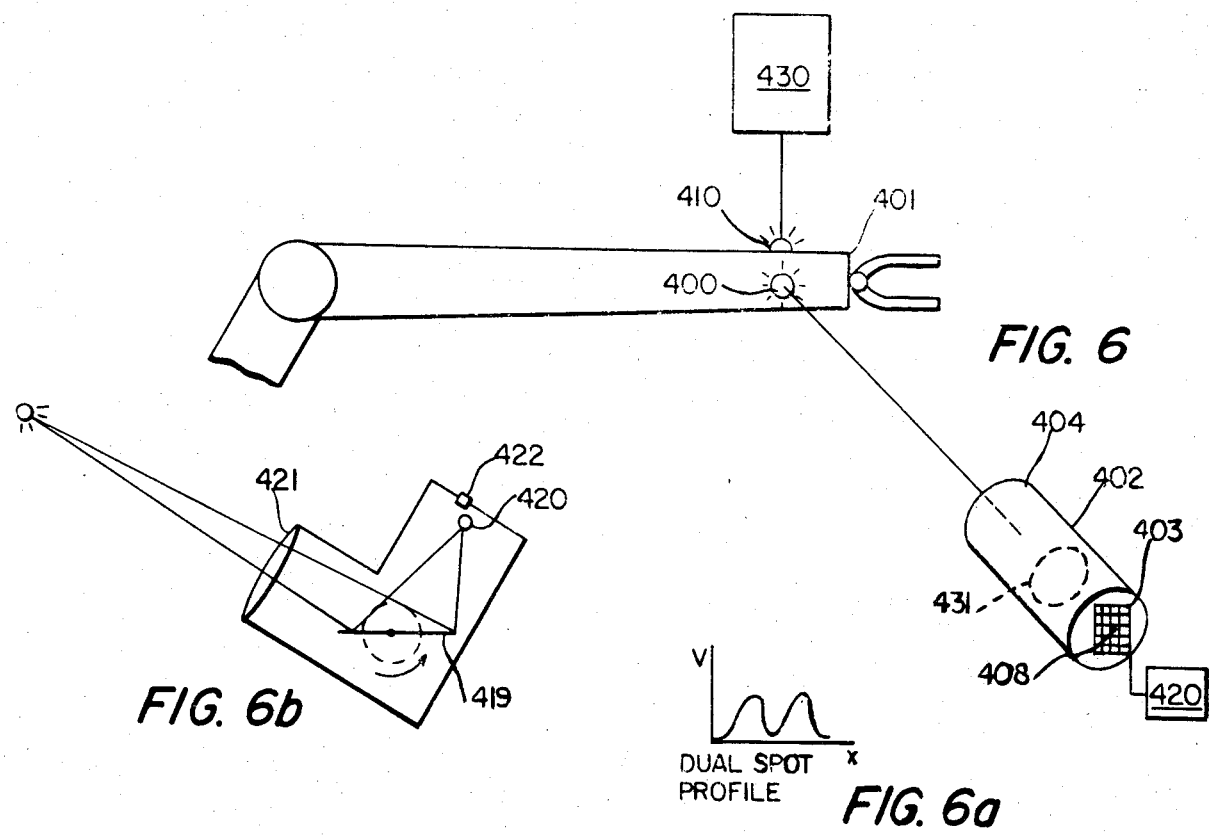
FIG. 6
FIG. 6b
DUAL SPOT PROFILE
FIG. 6a

ELECTRO-OPTICAL SYSTEMS FOR CONTROL OF ROBOTS, MANIPULATOR ARMS AND CO-ORDINATE MEASURING MACHINES

This is a continuation of application Ser. No. 262,492 filed May 11, 1984, now U.S. Pat. No. 4,453,085, issued June 5, 1984.

BACKGROUND OF THE INVENTION

This application discloses systems for use in the accurate positioning of robot arms and similar automation. It is adjunct or alternative to present methods utilizing digital coordinates transmitted from encoders based in the joints of the manipulator arms to provide control signals for motor actuators positioning said arms.

A big problem in the implementation of robots and the like in manufacturing and particularly assembly has been their lack of precision in dimensional placement. Such lack of precision in their arm locations is not surprising considering that they must have multiple flexured joints each one of which has to move in precise manner and often with coordinate calculations corrected by computer in order to put the end of the arm at a given point in space. Such precisions have led to high prices for certain types of accurately positionable robots (still short of the mark in many cases), or conversely an inability to perform certain desired applications.

The problem is otherwise defined as the stack up of dimensional uncertainties due to encoder error and mechanical sag or deflection anywhere in the system. While such deflections can be statically compensated, the problem becomes enormous when varient parts of different weights are lifted and rapidly accelerated and de-accelerated.

All of these problems are obviated in large measure by the invention here disclosed.

The goal of the disclosed invention is increased accuracy of positioning as in assembly or parts transfer at decreased cost of the manipulator. Also universality to many different part groupings or manipulators is also attained since one optical guidance system can function on many different types of automation systems.

Disclosed herein are methods and apparatus to provide an accurate external reference coordinate system for the robot (or other machine) which the robot system can utilize rather than relying on mechanical axis. This then essentially allows mechanically bad robots to become accurately positionable. In the grid reference case, for example, it also projects onto the part a certain reference system on which a sensor on the robot can interact with as well. This then can be used to link up the relationships of the two to each other, namely the robot and the part.

Another goal of the invention is to provide means for correcting droop and deflection in robot or co-ordinate measuring machine axes to improve their accuracy at a given cost.

The disclosed invention basically concerns the projection of specialized grid networks, directed laser beams or other light beams in space to provide a co-ordinate network or homing type function for the robot arm.

BRIEF DESCRIPTION OF THE DRAWINGS

FIG. 5 is a schematic perspective view of still another projectable pattern according to the present invention.

FIG. 6 is a schematic perspective view of a spot tracking device according to the present invention, with FIG. 6a showing a waveform associated therewith.

FIG. 6b is a schematic plan view of an image scanner containing an encoded rotary mirror which can be used with the embodiment disclosed in FIG. 6.

FIG. 7b is a schematic elevation view of the device depicted in FIG. 7a.

DETAILED DESCRIPTION OF THE PREFERRED EMBODIMENTS

Figure 1:
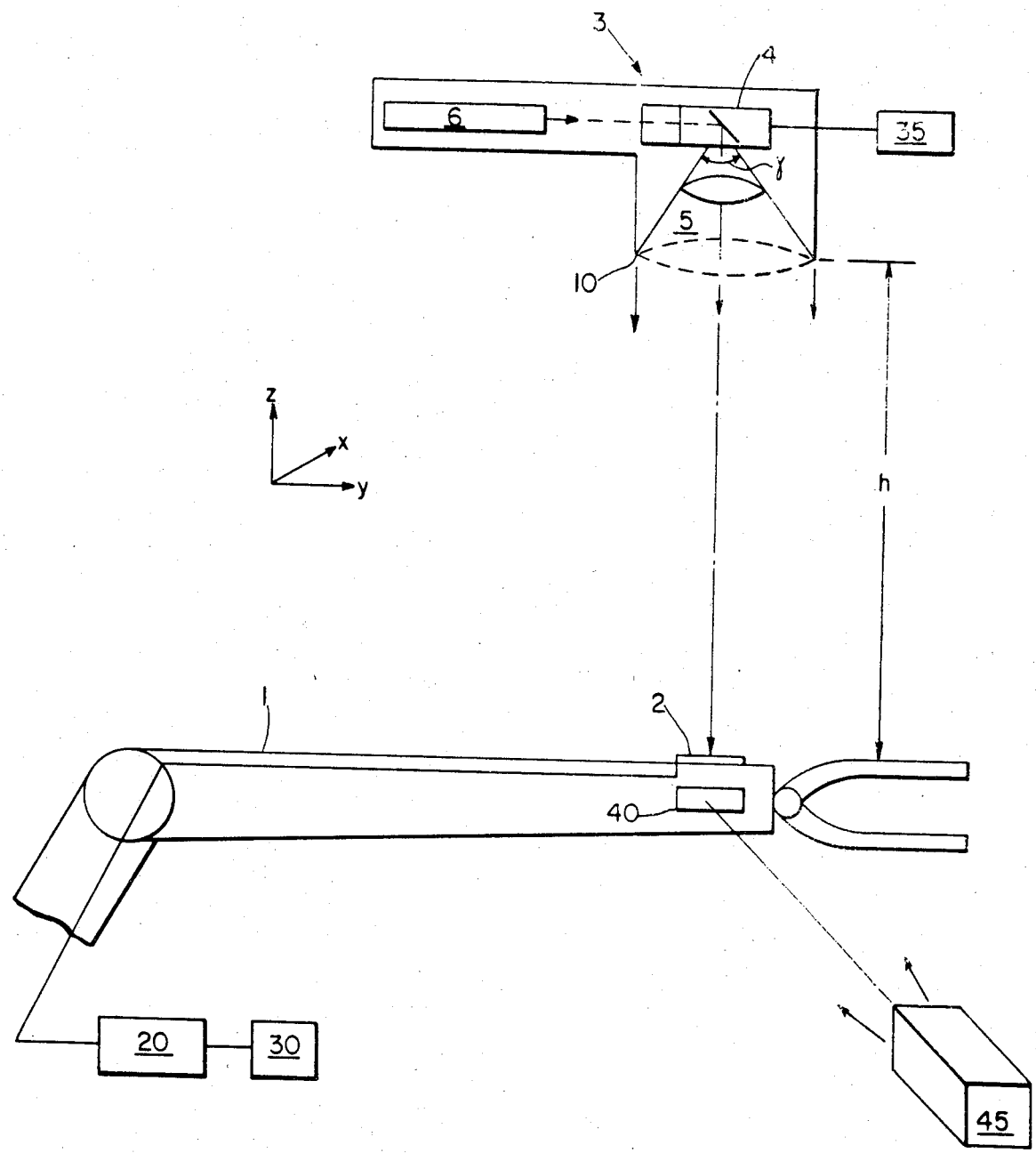
FIG. 1 is a schematic perspective view of an arm tracking device according to the present invention.

Embodiments to be described:

FIG. 1 illustrates a laser beam tracking embodiment utilizing two lasers in orthogonal planes each with two axis beam direction mirrors to direct beams at points in space where detectors on the robot 'hand' are, or are supposed to be. Dimensional data of actual hand location is taken off of laser beam direction encoders.

Optionally, position sensing detectors located on the robot hand or elsewhere (such as analog UDT SC-10 or matrix diode arrays) are used to generate position deviation signals of hand relative to beam position.

It is noted that it is also within the realm of this invention to provide for sensing of a part in the above grid or laser beam envelope and compute the location of this sensed part relative to the robot hand.

Figure 2:
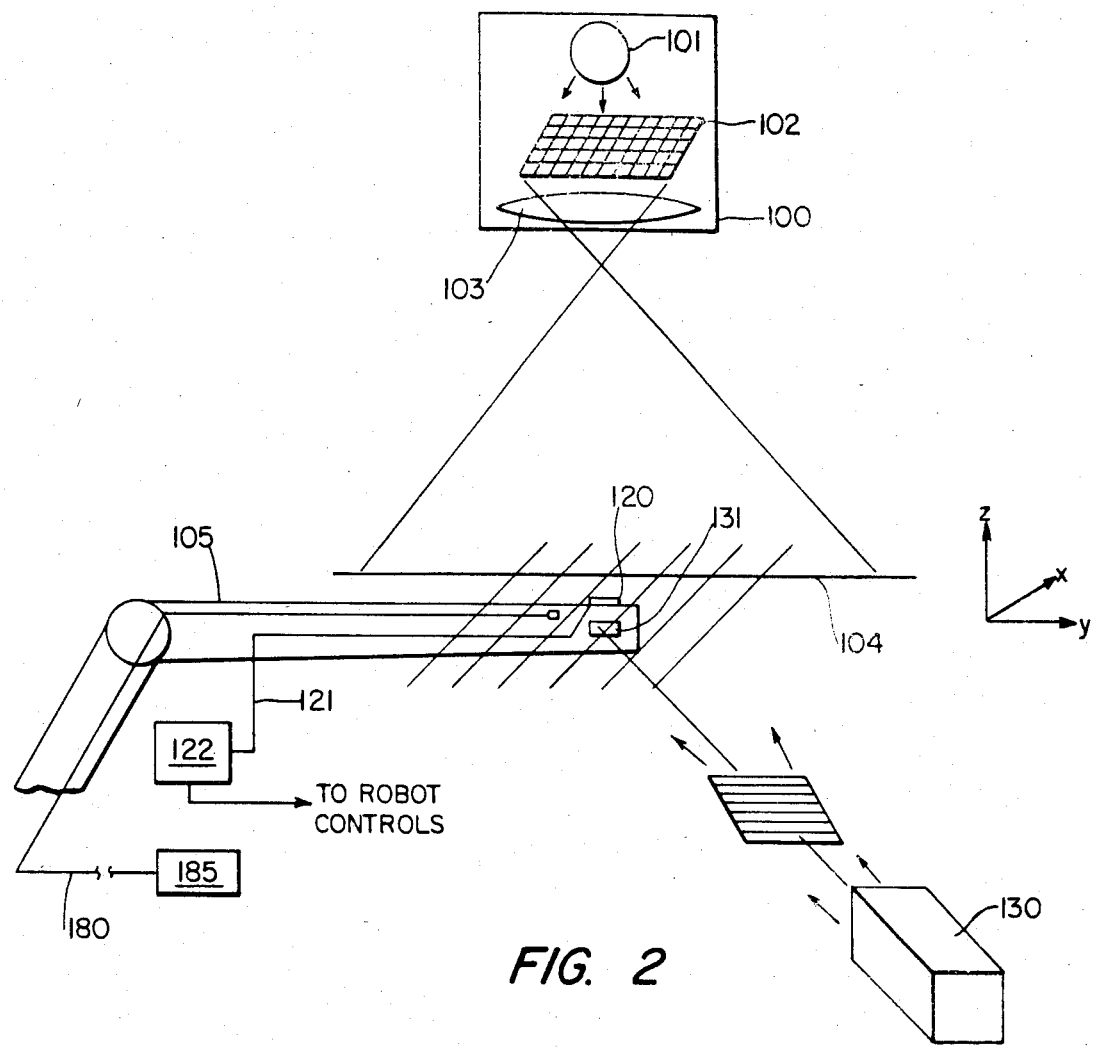
FIG. 2 is a perspective view of a grid projection device for monitoring the movement of an arm according to the present invention.

FIG. 2 illustrates a grid projection embodiment employing a pattern, in this case a grid pattern projected into the robots work area from overhead or side. One version uses a simple, single, point detector or pair of detectors on the robot "hand". Optionally, the normal robot joint resolvers may be used to interpolate between grid lines.

The alternative version has photodiode array detector(s) on the "hand" to provide on-board interpolation between grid lines. Diffraction based or other variable projection can also be used to aid in the tracking or interpolation function.

Figure 3:
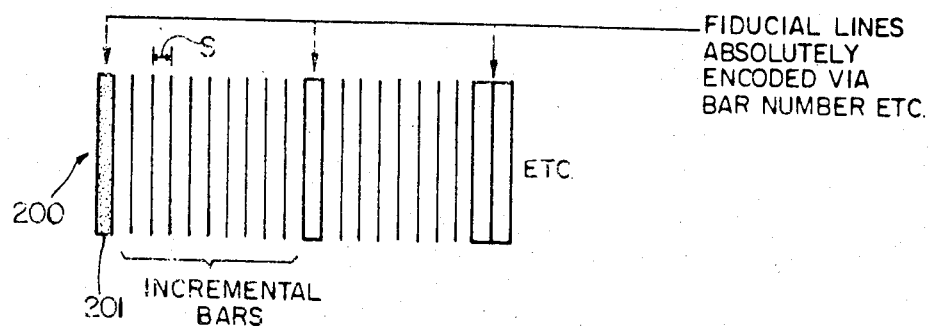
FIG. 3 is a schematic plan view of grill lines which are usable with the present invention.

FIG. 3 illustrates an embodiment wherein certain grill lines are coated to provide absolute reference point and a microcomputer is employed to track hand or arm position in the grid network.

Figure 4:
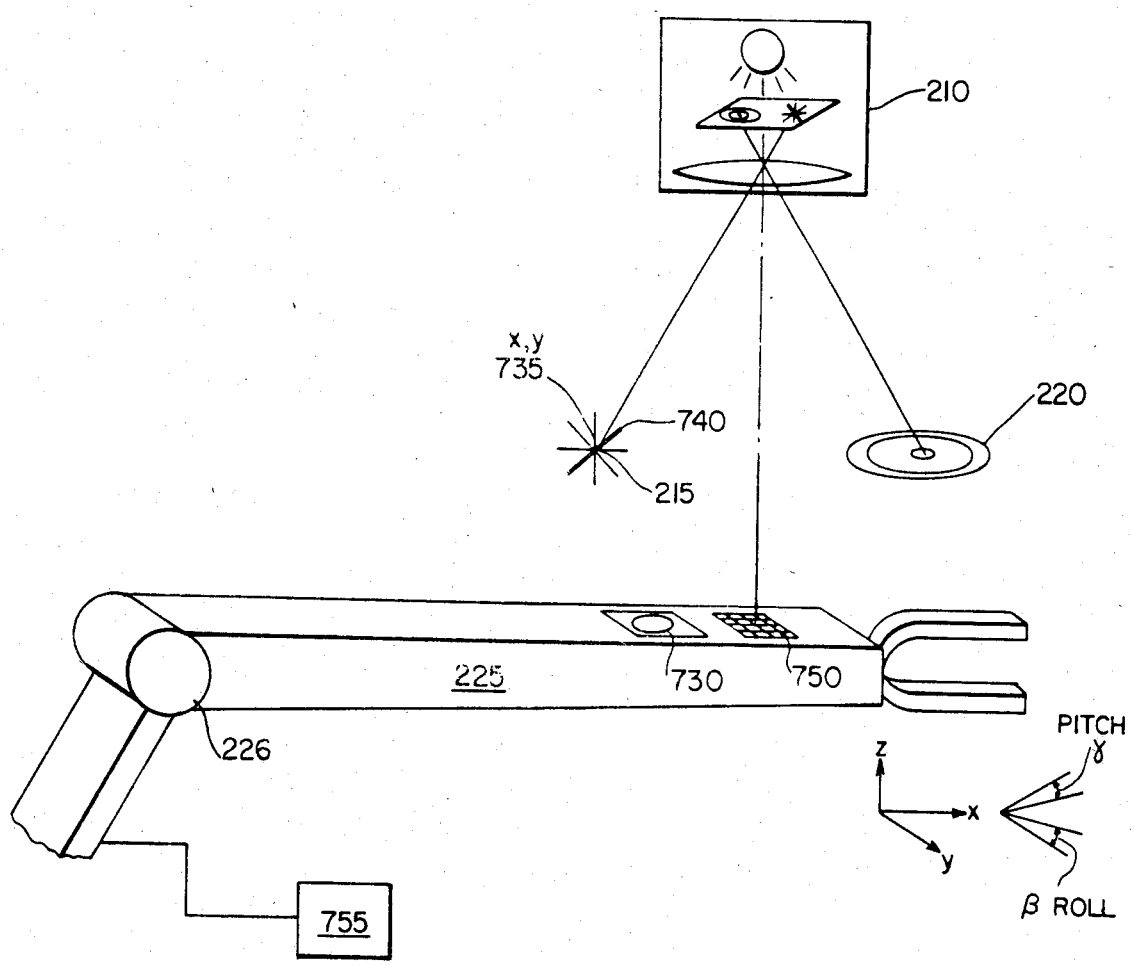
FIG. 4 is a schematic perspective view illustrating alternative projecting patterns of the present invention.

FIG. 4 illustrates a further embodiment projecting other pattern forms.

FIG. 5 illustrates interchangeable pattern projections.

FIG. 6 illustrates a spot tracking embodiment utilizing at least one light source "zone" on the hand and one, two axes camera and a second one or two axes camera at 90° and to track the spot. Spot location sensed in the camera field of view gives X, Y, Z coordinates. A zoom lens actuated by the predicted hand location maximizes sensitivity.

FIG. 7 illustrates an embodiment of the invention utilized for improving accuracy of coordinate measuring machines, cartesian robots and the like. Also shown in this application are multiple sensor based systems for use with this robot/CMM.

Figure 8:
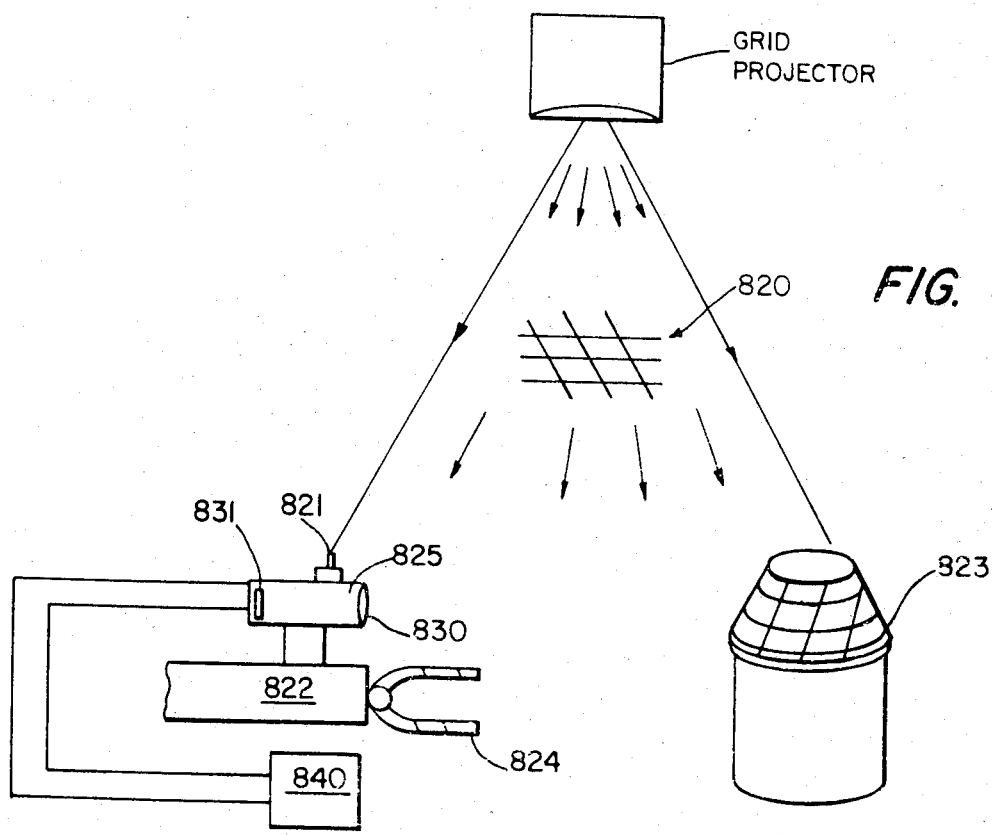
FIG. 8 is a schematic perspective view of a grid projecting system used as both a reference and to illuminate a part.

FIG. 8 is another embodiment of the invention using projected grid patterns.

Consider FIG. 1 showing a manipulator arm 1, with an optical sensor 2 at the end or after the last joint and an optical projector system 3, located above. In the optical projector system, in this particular case, there is an x-y axis galvo drive system 4 capable of arc second resolution guiding the beam 5 from laser 6 to the given point in space over a solid angle γ. For the purpose of this example, let us consider an optical system 10 as shown, capable of collimating this light to provide a conversion from the angular to the cartesian axes. This is not necessarily required and it does add cost for such a lens (particularly as the lens gets larger in diameter) but it makes the description herein simpler. The distance between the lens and robot 'h', is typically much larger than shown in the diagram, for example 1 meter.

As can be seen, upon given commands to the x-y galvos, which are encoded, the beam can be positioned everywhere in the x-y plane. Let us say that the beam is positioned at the value of x=3 cm, y=5 cm from the centerline of this optical system. One could simply direct the manipulator arm to go to the approximate value of that position, which it could do given its present positioning servos. However, as it got into the approximate area, the detector system 2, consisting of an x-y analog spot position sensor such as a UDT SC10 and amplifiers 20 located remotely picks up the spot from the laser and converts it into signals which cause the robot microcomputer control 30 to home onto the centroid of the laser energy.

This homing function takes out the last little bit of positioning error of the robot and allows it to hit every time at the right location. The limitations of accuracy are obviously the fine ability of the robot to adjust, the detector sensitivity and in the x and y accuracies of the projection galvos and in the deviations of the laser beam in space due to the thermal fluctuations.

Parametric analysis of all of the optical projection and laser beam aspects plus the detection capability easily puts the capability of a system as shown in FIG. 1 at 25 microns or less in positioning capability. This is far better than any present robot systems can do under these circumstances, and is sufficient to perform many assembly tasks not hitherto performable with robots.

Addition of another similar projection unit 45 located orthogonally to the first provided an ability to have a three dimensional capability. In this case, a second detector unit 40 located at right angles to the first on the robot arm senses the signal from the second projection unit 45 and the two then seek to position the arm in three dimensional space. Obviously, both of the two projections do not have to have a two axis capability. For example, the second unit only requires an ability to scan (and detect) the beam in the vertical or "z" direction. This is of paticular interest since this means that only cost can be saved but also one can go to perhaps a much larger scan vertically using a cylindrical symmetry lens or possibly a mirror system. Naturally as the zone covered becomes larger, the desirability of the inexpensive mirror increases.

It is also possible to consider operation of the unit shown in FIG. 1 without the collimating lenses such as 10 utilized to provide parallel projections. In this case, the beams are swept in angle and control microcomputer 35 is required to compute the desired trajectory of the beam, so as to speak, in x-y-z space or in robot polar co-ordinate space for any given angular input to the galvos.

FIG. 2 illustrates another version of the invention in which case a grid projection system 100 comprising light source 101, grid 102 and objective lens 103 is utilized to project a grid of lines 104 in space simultaneously. What is required then is a means to interpret the lines and to figure out where the robot arm 105 is in space from the characteristics of the grid network so created.

While additional sensing difficulties are encountered visavis FIG. 1, there is a big advantage in that the mechanical drive system is not present. In other words, there are no moving parts as in the galvanometer mirros of the FIG. 1 unit. Those rotary mirrors with their accurate encoders, (which form the basis of accuracy of the system), can be quite expensive. The grid system, naturally, has no problem since it is an all-digital item, simply projected into space and can even be projected stroboscopically using a flashed light source. It does have a problem with a grid line definition in space, however.

Let us consider now the case of using this system with the robot arm as above. In this case, the robot arm 105 may be positioned once again to the approximate location desired using its existing actuator and joint coordinate systems (although such positioning in this case is not actually required because using an enhanced version of the invention one can find ones way at all points in space).

However, let us consider the simplest case, that is where the robot goes to a rough location (using its own central system) where the grid network characteristics in the location desired are known. For example, suppose it is desired that the robot is to go to a location which happens to be halfway between two grid lines in space. These grid lines, for example, might be 1 mm apart at the point in question which means the sensing of the grid line spacing would have to be made to 1 part in 50 in order to get a 0.02 mm resolution of position—a desirable goal.

Figure 2A:
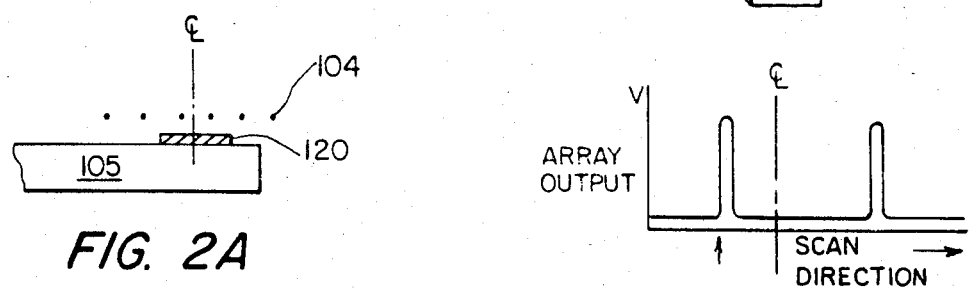
FIGS. 2a and 2b are schematic views of detectors usable in the embodiment disclosed in FIG. 2.

When the robot attempts to crudely position the hand to this location, let us say that it ends up two thirds of the way to one side of the line or the other (see FIG. 2a). In this case, a detector 120 comprised in this case by a photo detector array, for example a Reticon 256C, simply reads out where it is in space relative to the grid lines near it and causes the hand to move accordingly until it is centered halfway between. The all digital photo diode array is a perfect sensor for this particular use although considerable digital circuitry such as 122 remotely connected via cable 121 is required to interpret the result.

Sensing is generally required in two axes and in this ase a square (matrix) photo diode array such as a GE TN2500 can be used to scan in 2 axes. As in FIG. 1, another projector and detector (eg. 130 and 131) may be used to give three dimensional location. In this case, only a vertically spaced grill projector is required rather than a grid.

Figure 2B:
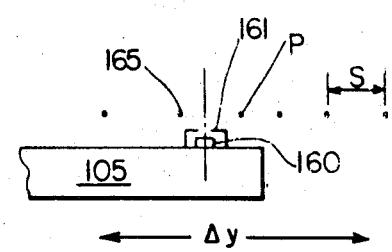

FIG. 2b illustrates the use of a single small detector 160 with narrow aperture (eg. 001" wide) 161 in place of the photo diode array 120. In this less expensive case, the grid is used simply to reference the robot at an exact position on a grid line 165 near the desired rest point 'p' in question. This grid line is detected by the detector 160 as let's say the 102nd line past the start point of the grid. The resolvers of the robot joints such as 105 then provide the high resolution (but often low accuracy) last step to reach 'p' by moving in xy from the grid line.

However, the resolver accuracy is diminished only from the grid line, not from the start point which would be the case if the robot resolvers were relied on for the whole motion.

The particular idea of utilizing a single detector in tracking through the grids of the pattern is quite appealing for simplicity. Indeed, if there were two projections orthogonally for three dimensional work, only two such simple detectors would be required. These could even be remoted by fiber optics such as 180 if desired, to a remote sensor unit 185. It is noted that all sensors utilized herein can be so remoted if desired, although it's obviously more difficult to remote a complete grid section or image than the simple fiber herein.

In order to make this simple system operate, it is desirable to track the grids on the fly. One really doesn't want to stop on a grid for example. In this regard, one can utilize the microcomputer control system of the robot to keep receiving input grid data and plot the rate of motion of the robot as it crosses the grid lines. This can be very helpful simply in using the grid lines to control accelerations and velocities of the robot without relying on what might be relatively complicated polar coordinate resolvers.

In any case, one can predict the rate at which one will reach a point and therefore can begin deaccelerating and as the detector passes the last grid line before the point of stopping desired, the resolvers can be ready to take the data at a slower data rate. In other words, the robot can move through the grid lines much faster than the resolvers can actually feed data at very high resolutions but as the robot slows down through the grid line projection to its final resting place, the resolvers can come into play to allow the interpolation between the grid lines.

Any programmed changes in direction of course are known to the robot control computer and can allow the incremental grid lines to be subtracted instead of added to the accumulated total indicative of position. If this information was also desired from the grid, a phase quadrature type grid detection having at least two detectors would be required.

While a constant spacing grid (in this case a uni-directional grille) of spacing 'S' has been shown, it is desirable to have fiducial lines to lend a degree of absoluteness to the grid. This allows absolute tracking without losing counts as can be the case with the incremental grid. In other words, shown in FIG. 3, a grid in this case a grille 200 where every tenth line, let us say, such as 201, has a different character to it such as a group of closely spaced lines accumulating in binary code or the like. This allows one to form an absolute network in two axes (or in three case axis if two projectors are used). Any sort of reasonable coding scheme may be used.

It should be noted that other types of grids or patterns can be used besides just simply projections of orthogonal lines. For example, polar coordinate grids could be used with circular concentric rings. In addition, local grids can provide a very good analysis in the area desired. For example, if the robot is required to go first to location xy, obviously the rough positional capability of the robot can get it to a location xy* let us say within 0.5 mm in either axis. Thus the grid for that robot routine (*) would have a particularly good grid projection network in that particular area around xy. It wouldn't have to fill all of space with grids in any other area let us say, than that particular one. In fact the grids wouldn't even have to be contiguous and can only be provided in special zones.

In other words, one might use a very special grid with radial lines radiating from the exact projected point xy which are then homed in on by the grid sensor on the robot. One can have many, many such homing radial line arrangements on any one grid in a projector.

FIG. 4 illustrates the above points. A projection source 210 projects discreet radial grid 215 and concentric ring grids 220 along specific lines in space from which suitable homing routines can also be provided. Detectors can be circular diode arrays, square arrays, points detectors, linear arrays and the like.

In the case shown, robot arm with one or more resolvers such as 226, is equipped with a circular diode array 730 (a Reticon 720C) composed of 720 elements. This array scans and instructs the robot to position centered on the centerline of radial grid 215 (center is present when all spacings between lines are equal) and oriented such that the axis x of the robot arm is along the axis of the wide line 740 of the projected radial grid. This wide line for example can be easily detected if it subtends 2×the number of detector elements as the others.

Thus both centering on an xy location as well as orientation have been achieved without reliance on the robots own axes.

The circular grid 220 is also useful for centering when an xy detector such as a linear or matrix array such as 750 is used. It also can be used for pitch or roll orientation (ie changes in γ or β) due to core shortening one or the other projected circular axes (ie. apparent change into an eclipse) detectable by the array and its analysis circuit and microcomputer 755.

Grids made especially for a given operation or part could be used mounted in a changeable turret which could be changed periodically from part to part etc. This gets to be rather interesting because what the grids are really storing could be actual data concerning the operation part and would be in effect an adjunct to the computer memory.

FIG. 5 is an embodiment of the invention illustrating the use of interchangeable grids or patterns of any sort. Illustrated too, is a pattern which actually guides the robot in the travel path to be taken. It is noted that this path can be flexibly and digitally generated in the FIG. 1 example via data fed to the galvo coordinate axes.

As shown, light source 270 projects through mask 217 containing the pattern desired which is imaged and projected by lens 272 into space. Grid 271 is one of several on a rotatable turret 273 which may be changed to suit different operations, parts or both.

Robot arm 302 with pattern detector 301 and associated analysis means has locked on to the pattern at the start location (dotted lines) and followed the projected image pattern arriving finally at point P as shown.

Again all actions are possible to better than 0.02 mm with no reliance on the robot's own positioning axes sensors (which may not be able to account for droop, etc.). It is also fast acting as the photodetectors have a very high response speed.

FIG. 6 illustrates an embodiment utilized for tracking one or more zones of light carried on the robot arm, gripper or any other suitable location. In this example, a single light source 400 preferably modulated, a LED, diode laser or flash lamp is mounted on robot arm 401. Its output is detected by image sensor 402, typically comprising a matrix array on whose face an image is formed by lens 404 of the light source 'spot'.

Microcomputer interrogates array 403 to determine the location of the spot image in two axes and hence the robot arm. Hardware processing such as described in the referenced applications is of value in finding the spot or zone locations.

To obtain three dimensions a second image scanner 430 is utilized either with source 400 or a second source 410 aimed in the direction of 430.

Analog image sensors such as Vidicons or position sensing photo cells such as the UDT SC-10 can also be used but these don't have the dimensional stability of the diode arrays. However, the SC-10 can be used with modulated LEDs to provide low cost stray light rejection—a desirable goal. This can also be done with diode laser sources and interference filters such as 431 (dotted lines) in conjunction with diode arrays.

The largest matrix arrays typically have 256×256 lines at this writing. If more resolution is required, the image scanner of FIG. 6b can be used which uses an encoded rotary mirror 419 to sweep the image 420 formed by lens 421 past a large 2048 element linear array 422. Thus resolution can be 2048×2048, all digital and drift free. Actually resolution can be 16× this using circuits disclosed in the referenced copending applications, yielding 32,000×32,000 resolution of field of view. This is crucial for high accuracy positioning over a large area.

Also shown in FIG. 6b is a dual LED or laser produced zone in which the dark space between is detected. This can be more reliable than a single diode laser operating in the $TEM_{01}$ mode.

For use with the 6b apparatus, the light source must be on for a sufficient time to allow the mirror scan to "find" it. However, one can also track the spot with the mirror to keep it on the array, said tracking performed using feedback data from the array to the scan drivers.

Figure 7A:
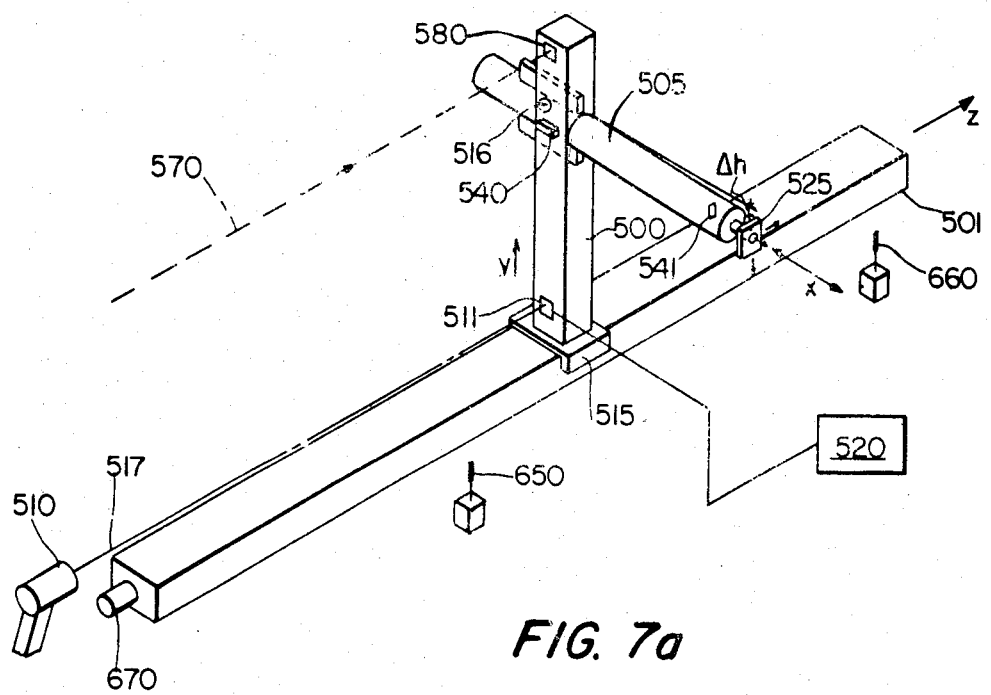
FIG. 7a is a schematic perspective view of a device for improving the accuracy of co-ordinate measuring systems according to the present invention.

Another type of control system described in this application essentially utilizes the laser tracking or light spot tracking concepts of FIG. 1 or 6 above but for the purpose of simply correcting mechanical deflections of the mechanical system of the robot or other system in one or more axes. This is shown in FIG. 7a relative to a coordinate measuring machine in cartesian coordinates where the horizontal arm which causes a moment is corrected via a laser beam system. This correction provides a lower cost system since the errors are dynamically corrected rather than having to be built in tremendous rigid fashion.

FIG. 7a illustrates another embodiment of the invention, utilized to correct or provide position data on a coordinate measuring machine or cartesian axis robot.

The motorized vertical (y axis) of said machine travels in the z direction along base 501. A horizontal arm 505 moves in and out in the x axis. Mounted on the end of the arm are optional rotational axes and in this case a sensor package 525 comprising one or more electo-optical sensors of the type shown in the referenced copending applications.

Typically, all such machines have encoded coordinate axes, x, y, z etc. In a large machine, however, various distortions occur which limit the true positioning accuracy to values considerably worse than those to which the encoders are capable. Accordingly the invention here discloses means for correcting these values, in effect making the machine better. Also disclosed are ways of zeroing the machine and inspecting an object for example, a tank hull or car body, 600.

First consider the problem of side to side deviations ($\Delta x$) as the base and carriage 515 travel in the z direction, for example 10 meters distance. In this case, the x position of the horizontal arm encoder 516 is corrected in computer 520 noting the position of a laser beam 517 from laser 510 on position sensitive detector 511. The latter can be analog (eg. UDT SC-10) but a driftless matrix array is preferred. Resolution can be 2 microns in correction over the full range of z travel. Laser beam 510 then defines the true axis of the machine from which x distances (and y distances too) are referenced.

Now consider the correction 'droop' or y axis drop in the horizontal arm. Since it is a cantilever, droop $\Delta h$ obviously occurs, especially when the arm is fully extended. In a similar fashion a laser 540 can be mounted on the vertical tower 500 and a similar detector 541 used to give a correction in y.

It should be noted that the laser beam 517 can be located higher up. For example, beam 570 used with detector 580 located at the top of the tower. A suitable laser is for example a He Ne gas laser or a diode laser with collimator. Location at the top also helps in the sense of monitoring tower deflection $\Delta x$ due to extension of the horizontal arm, as well as carriage side to side slop in x. Indeed, it can be desirable to use 2 beams, top and bottom simultaneously to allow a tilt of the tower to be computed and y position data of the sensor 525 corrected.

It is noted that sensor 525 can be replaced by a device for working material as well, ie. a welding head, rotating brush, paint sprayer or anything else whose position in space is critical.

Figure 7B:
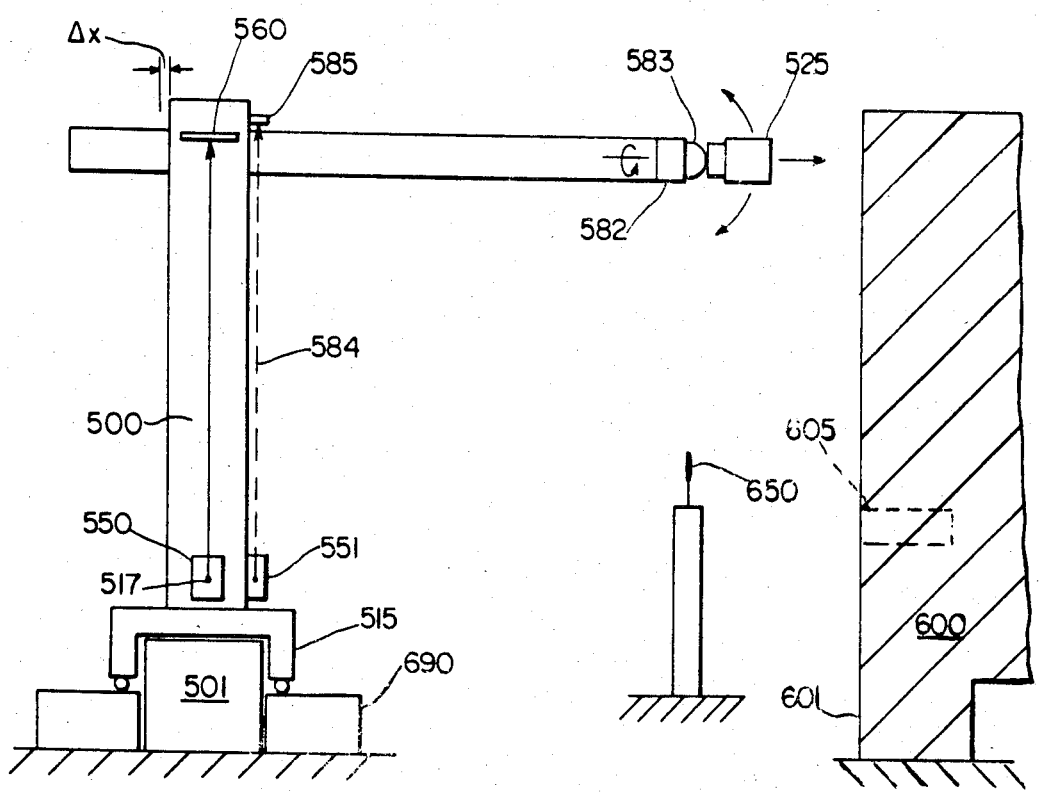

FIG. 7b illustrates a closeup of the unit illustrating means for correcting tilt $\Delta x$ to horizontal arm extension in this case a penta prism 550 directs beam 517 vertically up the tower as determined by the prism axis set up at the carriage 515. Detector 560 notes any deflection of the tower 500. This plus the x axis horizontal arm extension can be used to correct the vertical location y of the sensor 525, in this case also a function of rotary axis encoders 582 (angular movement in yz plane) and 583 (angular movement in the xy plane). The same system can be used to correct tower tilts in the z direction by using a similar penta prism arrangement 551 to direct a beam 584 to detector 585.

Let us now consider the usefulness of this system, where it is desired to inspect tank hull 600 during manufacture for numerous edge and hole locations in the side 601 such as 605 in the yz plane, locations in x of various points on side 601, (using an additional sensor or detector), and various faces on side 601 for surface finish problems such as no clean-up etc.

A final note relative to the tank inspection example. The problem here is to build a fast, reasonably priced inspection machine. These two criteria defie excess rigidity of the inspection machine, particularly considering floor distortions caused by placing a 30 ton tank next to the machine. This explains why active correction of bending moments etc. and other distortions has been emphasized here.

Also in potential need of correction is the accuracy of the x y and z encoder systems. This can be accomplished by locating one or more test points such as 650 and 660 along the length of the tank in zones where no pertinent information is desired from the tank hull. These points are masters layed out specifically to allow the unit to rezero on them at specific points along the z axis. The electro-optical sensor unit senses a reticle location on a plate which gives the xy and z location.

If one rezeros at point 650 and 660 not shown spaced in the z direction it is only necessary to use the z axis encoder 670 to provide data between the two zero points. If this is not good enough resolution, a special short range high resolution z axis encoder (not shown) can be added to the sensor mount to move the sensor in z a distance relative to a master point such as 650.

It is noted that it may be desirable at the various measuring points along the tank in the z axis to lower the tower base down into granite pads such as 690. This removes warpage in the z axis slide 501 from the answer. Pads 690 etc. can be anchored deep into the floor. At these read locations the reference posts such as 650 can logically be placed.

It is particularly easy to envision that the system here described is causing a reduction in price of such tricky coordinate measuring systems if one sets the vertical post support down onto the base pad such as 690 after movement. In other words, extremely crude movements can be used as long as one sets the unit down on an adequate base such as 690.

It is noted relative to FIG. 1 showing the laser tracking mode of operation, that the method for employing this can be varient. For example, one may use the x and y galvos of the projection system to simply point the beam at the desired resting place of the robot. In this manner, the robot's own coordinate axes are utilized to move the robot through the desired path to the approximate point in question. Where near the approximate point, the detector on the robot is obviously in a position to pick up the spot and provide these z and y feedback signals to the robot's apparatus to home the robot in on the spot position.

The second mode of operation of the laser projection unit is the continuous path approach whereas the laser spot actually is directed right to the detector on the robot and then the spot moved in space according to the preprogrammed coordinate motion desired out of the robot arm. In this case, the active tracking signals are provided by the detector to cause the robot's axis to follow the spot. In short the robot's axes are not fed the control signal but it is instead fed to the laser.

It should be noted relative to the spot tracking version of FIG. 6, that this same spot tracking can be employed in the FIG. 7 arrangement as well. In this case, again the laser 510 or 540 is replaced with a imaging lens and detector with the spot now located on the coordinate arm. In this case the position of the spot is measured and deviations compared. The problem of course is that over short ranges this is quite workable but over long ranges the telephoto lenses etc. required to keep the high resolution of the spot in view on the sensing detector are too much for accurate measurement. It is much more convenient to do it with the laser beam shown. Therefore, it is considered that this method would work for the horizontal array 505 of the CMM machine as shown but not for the total length of travel direction.

FIG. 8 illustrates the case where the grid projection such as 820 as in FIG. 3 etc., is employed to act as a reference to detector 821 located on the arm 822 of the robot as well as to illuminate a part, 823 and the gripper 824.

In this manner data on the way in which the grid lines intersect the part and gripper can be obtained by camera 825 comprising lens 830 and matrix detector array 831 and used by computer 840 to determine the arm to part or arm to gripper to part relationship. This is quite useful for dealing with arbitrary parts and locations, and/or in conjunction with nonencoded or interchangeable or damaged grippers (where gripper location is not precisely known).

It is noted that the word 'light' in this application can mean any wavelength of electro-magnetic radiation X-ray through infra red. Visible and near IR wavelengths are preferred, however.

As mentioned, this invention has a main goal; the provision of coordinate position and orientation of robots independent of the robots axes and/or the correction of those axes by updating axis encoder or resolver data in a local area (generally around the work in question).

Another attribute of the invention, particularly the grid or spot version, is simple calibration of the axes. For example, the robot can pass through 10 grid lines in a certain zone and determine its average error from the sensed data of the known grid spacing and use this to correct its own data.

Figure 7C:
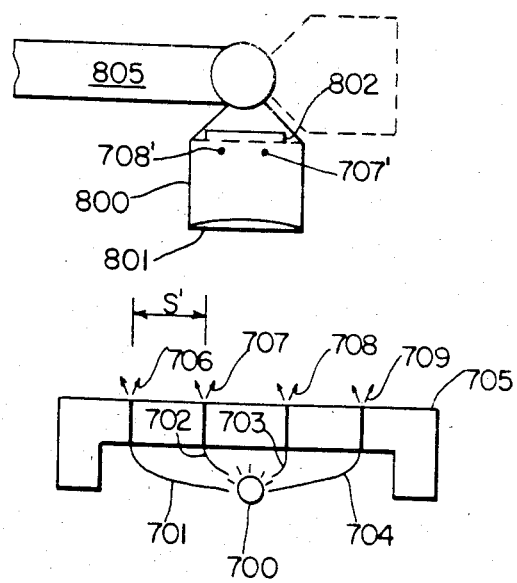
FIG. 7c is a perspective elevation view of test points for the embodiment disclosed in FIG. 7a which are light sources.

The test points 650 need not be reticle plates but can be any means suitable to provide an update of calibration of the system and/or a designated point in space. For example, grids, spots etc. can be used. A remote light source with fibers in a plate can also be used as shown in FIG. 7c.

Here lamp 700 illuminates fibers 701, 702, 703, 704 whose ends 706–709 are mounted in plate 705. Sensor 800, comprising lens 801 and photo diode array 802 is mounted on the end of arm 805. The array finds the fiber end points desired to update its calibration. With the four points as shown, spaced 5' apart, total operation is possible over the range desired-independent of the robot's own axes, relying on the diode array as the measuring element for movements in z (or x or y or a combination thereof with an additional sensor or detector).

Such precisely positioned sources can be indeed located along the total length or a fraction thereof of the machine axes in the x, y, or z or any or all of said axes to allow actual measurement to be made using the diode array to interpolate between light source positions.

What is claimed is:
1. A method for correcting position data of a machine having a member movable on at least two co-ordinate axes, said machine comprising encoder means for providing rough position data to indicate the rough position of said member in each of said axes, said method comprising the steps of:
    moving said moveable member to a position data correction location;

electro-optically determining the actual position of said member in at least two co-ordinate axes relative to a reference point external to said machine;

generating a signal representative of the electro-optically determining actual position of said member in said co-ordinate axes; and utilizing said signal to correct the rough position data in said encoder means for said co-ordinate axes.

2. An apparatus for inspecting an object as claimed in claim 1 further comprising a short range high resolution encoder for determining the relative location of said external reference point in a third co-ordinate axis.

3. An inspection apparatus for inspecting an object and providing corrected position data with respect to that object said apparatus comprising a machine having a member moveable in at least two co-ordinate axes, and comprising position determining means for providing rough position data to indicate the rough position of said member in said at least two axes relative to the object being inspected;

means for moving said moveable member to a position data correcting location;

means for electro-optically determining the actual position of said member in said co-ordinate axes relative to a reference point external to said machine;

means for generating a signal representative of the electro-optically determined actual position of said member in the said axes; and means responsive to said signal for correcting the rough position data in said position determining means for the said co-ordinate axes of the moveable member to thereby correct the position data of the moveable member relative to the object being inspected.

4. An apparatus for inspecting an object as claimed in claim 3 wherein said means for sensing the location of the object comprises said electro-optical means.

5. An apparatus for inspecting an object, said apparatus comprising:

a machine having a member moveable in at least two co-ordinate axes, and including encoder means for providing rough position data to indicate the rough position of said member in each of said co-ordinate axes and sensor means, mounted on said machine on said moveable member, for sensing the location of the object or a feature thereof;

said machine further comprising means for moving said moveable member to a position data correcting location;

electro-optical means for electro-optically determining the actual position of said member in each of said at least two co-ordinate axes relative to a reference point external to said machine;

means for generating a signal representative of the electro-optically determined actual position of said member in said at least two co-ordinate axes;

position data correcting means for correcting responsive to said signal the rough position data provided in said encoder means for the two co-ordinate axes;

and means, responsive the two co-ordinate corrected rough position data and the output of said sensor means, for providing an indication of the location of the object or a feature thereof.

6. A method for inspecting an object using a machine having a member moveable in at least two co-ordinate axes, said machine comprising encoder means for providing rough position data to indicate the rough position of said member in each of said axes, said method comprising the steps of:

using a sensor mounted on said member to sense the location of the objection or a feature thereof;

moving said moveable member to a position data correction location;

electro-optically determining the actual position of said member in at least two co-ordinate axes relative to a reference point external to said machine;

generating a signal representative of the electrooptically determined actual position of said member in said cartesian co-ordinate axes;

utilizing said signal to correct the rough position data in said encoder means for said co-ordinate axis; and using said co-ordinate corrected rough position data and the output of said sensor to provide an indication of the location of the object or a feature thereof.

* * * * *